US006897394B1

(12) United States Patent
Dibiaso et al.

(10) Patent No.: US 6,897,394 B1
(45) Date of Patent: May 24, 2005

(54) SYSTEM AND METHOD FOR AUTOMATED DOCUMENT PROCESSING

(75) Inventors: Thomas F Dibiaso, Mt. Laurel, NJ (US); Robert R. DeWitt, Marlton, NJ (US); George L. Hayduchok, Mount Holly, NJ (US)

(73) Assignee: Opex Corporation, Moorestown, NJ (US)

( * ) Notice: Subject to any disclaimer, the term of this patent is extended or adjusted under 35 U.S.C. 154(b) by 0 days.

(21) Appl. No.: 09/542,418

(22) Filed: Apr. 4, 2000

(51) Int. Cl.[7] .............................. B07C 5/00; G06K 9/00

(52) U.S. Cl. ....................... 209/584; 209/900; 700/219; 700/226

(58) Field of Search ......................... 209/3.1, 584, 601, 209/603, 604, 630, 900, 942; 414/411, 412

(56) References Cited

U.S. PATENT DOCUMENTS 5,460,273 A * 10/1995 Stevens et al. ............. 209/584
5,464,099 A * 11/1995 Stevens et al. ......... 209/900 X
6,196,393 B1 * 3/2001 Kruk, Jr. et al. ............ 209/630

* cited by examiner

*Primary Examiner*—Christopher P. Ellis
*Assistant Examiner*—Jonathan R. Miller
(74) *Attorney, Agent, or Firm*—Stephen H. Eland; Dann, Dorfman, Herrell and Skillman

(57) ABSTRACT

A method and apparatus for processing mail is provided. A stack of mail is placed in an input bin in a feeder module. A feeder serially feeds the envelopes into a transport path. The envelopes are then examined to determine if the contents are qualified for extraction. Envelopes that are qualified for extraction are opened in a cutting module and then conveyed to an extraction module to extract the contents from the envelopes. The contents may then be scanned and reoriented as desired so that the contents are in a pre-determined orientation. The contents are then sorted into a stacker.

23 Claims, 13 Drawing Sheets

SYSTEM AND METHOD FOR AUTOMATED DOCUMENT PROCESSING

FIELD OF THE INVENTION

The present invention relates to a system and method for processing documents, and more specifically, to an apparatus and method for extracting documents contained within envelopes, and separating the documents. In addition, the present invention also relates to a system and method for determining the sequence and order of documents extracted from an envelope and selectively reordering and reorienting the documents. Further, the present invention also relates to a system and method for acquiring electronic image data for the documents extracted from an envelope.

BACKGROUND OF THE INVENTION

Automated and semi-automated machines have been employed for processing documents such as bulk mail. Due to the large quantity of mail received by many companies, there has long been a need for efficient sorting of incoming mail. Document sorting has become particularly important in the area of remittance processing.

Utility companies, phone companies, and credit card companies routinely receive thousands of payment envelopes from their customers on a daily basis. Typically, a customer payment envelope contains an invoice stub and some type of customer payment, usually in the form of a bank check or money order.

In order to perform remittance processing, the remittance transaction is initially extracted from the envelope. In some instances, the extraction may be done manually. In other instances, the extraction may be done in an automated manner. However, regardless of the manner in which the remittance transactions are extracted, further processing of the invoices and accompanying checks is still required before remittance processing can be effected.

Remittance processing equipment typically requires each batch of remittance transactions to be organized so that each invoice-check pair is properly ordered and oriented. For example, conventional remittance processing equipment may require each transactional pair of documents to be ordered so that the invoice is positioned in front of or on top of each check. Furthermore, each invoice and each check should be oriented in a right-side-up, face-forward orientation.

In addition to processing singles transactions, frequently there is a need to automatically process transactions having more than two documents. However, since automated document processing primarily focuses on processing high-volume singles transactions, the known devices do not allow processing of mail containing transactions having three or more documents. Accordingly, it is desirable to provide an apparatus that has the flexibility to automatically process singles mail and mail having more documents.

SUMMARY OF THE INVENTION

In accordance with the present invention, a system for processing envelopes containing transactional documents is provided. A single transaction defines the contents of a single envelope. A transaction preferably includes at least a pair of documents, such as an invoice and an accompanying check. However, envelopes may be misstuffed so that, for example, a transaction only includes a single document, such as only check or only an invoice. Typically, it is desirable to determine transactional boundaries, i.e. where one transaction or group of document ends and where the next transaction or group of documents begins. Accordingly, the system preferably includes a system controller that functions to accurately track the sequential order of the documents being processed. As a result the system can function to process the documents so that each document in a transaction is identified with the other documents in the transaction.

The system includes an input bin for receiving envelopes containing transactional documents. Each envelope is examined to determine whether the envelope satisfies criteria for extraction. Qualified envelopes are opened and the contents are extracted. The extracted contents are optionally stacked in a bin without further processing or singulated and serially conveyed along a document path before being sorted and stacked into a plurality of bins.

Preferably, the system also determines the order and orientation of each transactional document, and acquires electronic image data for each singulated document. If desired, the documents are selectively manipulated so that the documents are disposed in a predefined order and orientation. The documents are then sorted and stacked into a plurality of bins.

DETAILED DESCRIPTION OF THE PREFERRED EMBODIMENTS

Figure 1:
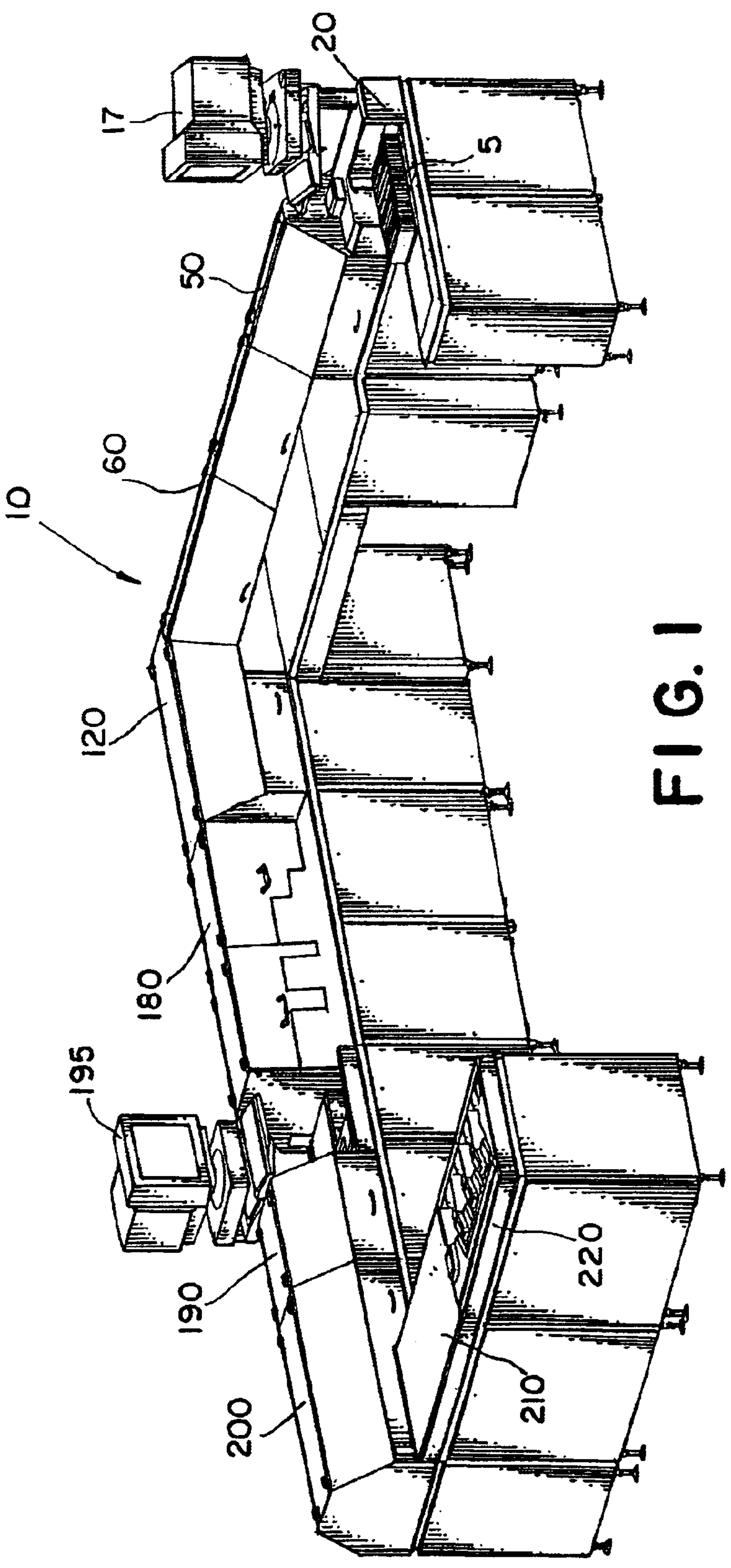
FIG. 1 is a perspective view of an automated document processing device manifesting aspects of the present invention.

Referring to the drawings in general and more specifically to FIG. 1, an apparatus 10 for automatic processing of documents contained within envelopes is illustrated. The apparatus 10 processes documents by extracting the documents from their envelopes, selectively reordering and reorienting the documents, and if desired, acquiring and exporting image data for selected documents and sorting the documents into bins.

Referring to FIGS. 1–14, a general overview of the flow of documents through the apparatus is now provided. Initially, a stack of documents within envelopes 5 is placed into a feeder module 20 having an input bin. The input module has a feeder 30 that serially feeds the envelopes to a pre-sort module 50 that includes a thickness detector 51 and a metal detector 55 (shown in FIG. 2). The pre-sort module 50 examines each envelope to determine whether the envelope qualifies for extraction. Envelopes that are qualified for extraction are opened in a cutting module 60 and then conveyed to an extraction module 120 to extract the transactional contents from the envelopes.

A singulator 150 separates the documents within the transaction and serially feeds the documents to a MICR module 175. Alternatively, if the thickness of the contents within an envelope is greater than a predefined thickness, the contents are not fed to the singulator 150. Instead, the contents are fed to a thick stack module 180, which stacks the contents, and no further processing is done on the contents. From the singulator 150, the documents may be fed to a stacker 220 that stacks the documents into a plurality of bins. Alternatively, after the documents are singulated, a MICR module 175 in the extraction module 120 (shown in FIG. 10) determines the orientation of documents in the transaction having a MICR line printed with magnetic ink.

Preferably the apparatus 10 also includes an imaging module 190 that acquires an electronic image of each document in a transaction. The electronic image data can be stored for later retrieval during remittance processing. In addition, the apparatus can process the image data to determine the orientation of documents. In particular, since the MICR module 175 detects the orientation of documents having a MICR line, the image data from the imaging module 190 is utilized to determine the orientation of documents that do not have a MICR line. The MICR module 175 and the imaging module 190 also determine the order of the documents in a transaction.

Preferably, the apparatus 10 also includes a reorder/reorient module 200 that selectively manipulates the documents so that the documents in each transaction are in a predetermined order and orientation. After the documents are placed in the proper order and orientation, a printing module 210 prints information on the documents, such as the batch number, the transaction number, the document number, and the date on which the document was processed. From the printer module 210, the documents are conveyed to a stacker 220, which sorts the documents into a series of bins.

A system controller 19 (see FIG. 14) monitors the flow of documents in response to signals received from the various components of the apparatus 10. In particular, the system controller 19 monitors the boundaries of each transaction as the documents are processed. Because each envelope defines the boundaries for each transaction, and the documents are initially contained within envelopes, the boundaries for each transaction are known. Once documents are extracted from an envelope, the system controller monitors the documents for each transaction to ensure that documents from one transaction do not become associated with the documents from a different transaction. For example, the system controller 19 ensures that a check from envelope A does not become associated with an invoice from envelope B. This is referred to as maintaining transactional integrity. The system controller 95 ensures the transactional integrity is maintained through the entire process.

Two personal computers allow an operator to interface with the system controller 19. A operations computer 17 is the primary interface with the system controller 19 for controlling the operation of the apparatus 10. The operations computer includes a monitor to display information regarding the processing of documents. A keyboard is also provided to allow the operator to input various information necessary to process a group of documents, such as the type of transactions in a batch to be processed. In addition, if the apparatus 10 includes an imaging module 190, preferably the apparatus also includes an imaging computer 195. The imaging computer allows the operator to interface with the system controller 19 regarding operation of the imaging section on the apparatus.

Feeding Documents

Figure 2:
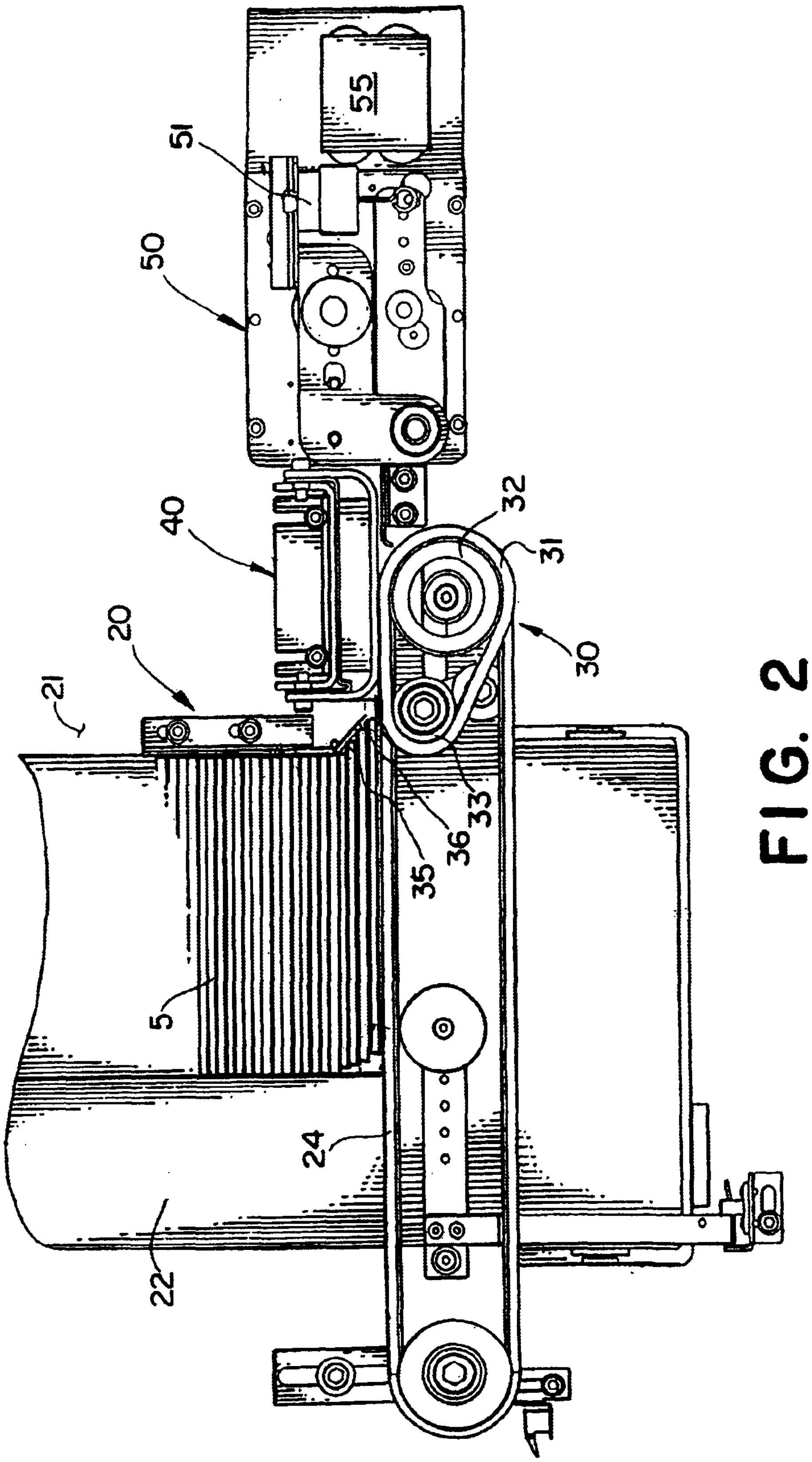
FIG. 2 is an enlarged fragmentary plan view of the feeder module of the device illustrated in FIG. 1.
Figure 3:
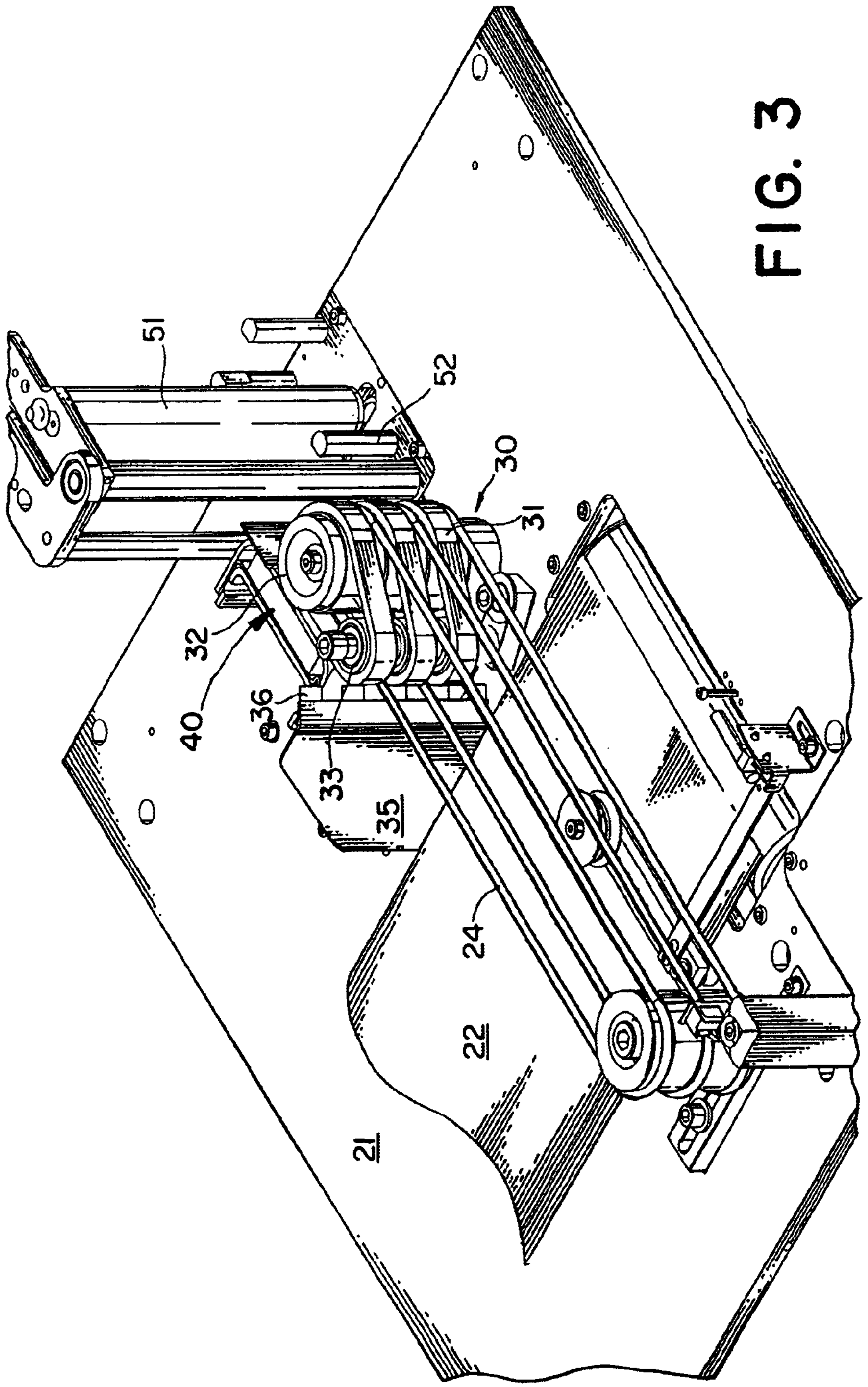
FIG. 3 is an enlarged fragmentary perspective view of the feeder module illustrated in FIG. 2.

Referring now to FIGS. 2–3, the details of the feeding module 20 are illustrated. The feeding module 20 includes a conveyor 22 that conveys a stack of mail 5 toward a feeder 30 that serially feeds the envelopes to the pre-sort module 50. The conveyor 22 comprises a flat conveyor belt disposed generally parallel to the base plate 21 of the feeding module 20. The conveyor 22 is preferably wider than the envelopes, and forms a generally planar surface for receiving the stack of mail as shown in FIGS. 1 and 2.

From the perspective of FIG. 2, the conveyor 22 conveys the stack of envelopes downwardly toward a plurality of pre-feed belts 24. The pre-feed belts 24 urge the lead envelope in the stack of mail 5 toward the feeder 30. As shown in FIG. 3, the feeding module 20 preferably includes three pre-feed belts 24 vertically separated from one another. As the pre-feed belts 24 urge the envelopes forwardly, a guide 35 guides the envelopes toward the feeder 30. The envelopes pass through an opening between the guide 35 and the feeder 30. This opening is referred to as a feed slot. Preferably a pivotable hinge plate 36 attached to the guide plate extends into the feed slot. The hinge plate 36 is biased into the feed slot so that in its relaxed position, the hinge plate operates to reduce the thickness of the feed slot. By reducing the thickness of the feed slot, the hinge plate 36 reduces the number of envelopes that can be readily fed through the feed slot to the feeder 30 simultaneously. In addition, since the hinge plate is pivotable, when a thick piece of mail engages the hinge plate 36, the piece of mail displaces the hinge plate away from the feed slot so that the piece of mail can fit through the feed slot.

As shown in FIG. 3, the feeder 30 comprises a plurality of vertically spaced apart feed belts 31 entrained around a drive pulley 32 and an idler pulley 33. In addition, the pre-feed belts 24 are also entrained about the feeder drive pulley 32, so that the feeder drive pulley 32 drives the feed belts 31 and the pre-feed belts 24. The pre-feed belts 24 urge the envelopes along a document path toward the feeder 30. The feeder 30 serially feeds the envelopes along the document path toward the pre-sort module 50.

The feeding module 20 is configured to reduce or eliminate double feeds, which refers to the problem of simultaneously feeding more than one envelope at a time. In particular, the feeding module 20 includes a retard assembly 40 confronting the feeder 30. The retard assembly 40 operates to engage and hold back trailing envelopes while the feeder 30 feeds the lead envelope away from the stack. If two envelopes are simultaneously fed into the document path between the retard assembly 40 and the feeder 30, the trailing envelope engages the retard assembly 40 and the leading envelope engages the feeder 30.

The retard assembly 40 includes an outer surface formed of a medium-friction material, and the feed belts 31 of the feeder 30 are formed of a high-friction material. Accordingly, the friction between the retard assembly 40 and the trailing envelope, and the friction between the feeder 30 and the leading envelope are both greater than the friction between the two envelopes. In this way, when two envelopes are simultaneously fed between the retard assembly 40 and the feeder 30, the feeder feeds the leading envelope, while the friction between the retard assembly 40 and the trailing envelope impedes forward displacement of the trailing envelope.

Figure 4:
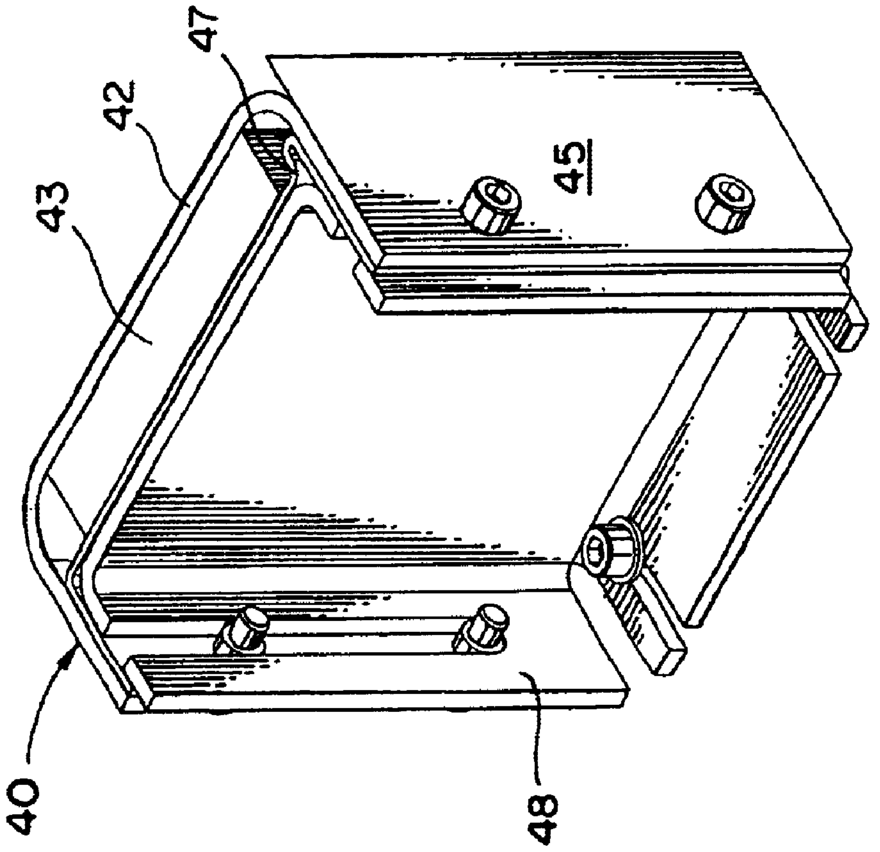
FIG. 4 is an enlarged perspective view of a retard assembly of the feeder module illustrated in FIG. 2.

The details of the retard assembly 40 are shown in FIG. 4. The retard assembly includes a mounting bracket 48 for attaching the retard assembly 40 to the base plate 21 of the feeding module 20. The mounting bracket 48 projects upwardly from the base plate forming a planar surface substantially parallel to the document path. The sides of the mounting bracket bend outwardly away from the document path forming a pair of spaced apart arms transverse the document path. A backing pad 43 formed of a resilient pliable material such as urethane foam is fixedly attached to a back plate 47 that confronts the outstanding substantially planar portion of the mounting bracket 48. A cover 42 formed of medium-friction materials, such as silicone rubber, covers the backing pad 43 and is attached to the mounting bracket 48.

Preferably the cover is at least approximately as tall as the height of a standard number 10 envelope. Further, as shown in FIG. 4, the cover 42 forms a generally U-shaped channel, having a pair of spaced apart arms transverse the document path connected by an intermediate portion disposed generally parallel to the document path. In its relaxed state, the intermediate portion of the cover bows outwardly away from the backing pad 43. However, as shown in FIG. 2, the cover 42 engages the feeder 30, displacing the cover inwardly into engagement with the backing pad.

The retard assembly 40 projects into the document path. In this way, as the envelopes are displaced forwardly along the document path from the conveyor 22, the lead edge of the envelope engages the cover 42 of the retard assembly 40. As shown in FIG. 2, the retard assembly confronts the feeder 30. Accordingly, when the envelope contacts the retard assembly, the envelope deforms the cover 42 inwardly toward the back plate 47.

Since the cover is formed of a resilient material and the cover bows outwardly in its relaxed position, deforming the cover inwardly creates a biasing force against the envelope, which increases the frictional force between the retard assembly 40 and the envelope engaging the retard assembly. Further, as the envelope thickness increases, the cover deformation increases, which in turn increases the bias resulting in further increased frictional force between the retard assembly 40 and the envelope. This increased frictional force aids in retaining thicker and larger envelopes. In addition, as discussed previously, the cover 42 confronts a foam backing pad, which is also resiliently deformable. Accordingly, when the envelope thickness is sufficient to deflect the cover inwardly against the backing pad 43 and deform the backing pad, the resilience of the backing pad creates further biasing forces that further increase the frictional force between the retard assembly and the envelope.

The retard assembly 40 further includes a flexible shield 45 attached to the leading edge of the assembly. The flexible shield projects outwardly into the document path. Since the shield projects into the document path, as an envelope is displaced from the conveyor 22, forwardly along the document path, the leading edge of the envelope engages the flexible shield. Continued forward displacement of the envelope displaces the shield forwardly and inwardly so that the shield overlies a portion of the retard cover 42. In this way, the shield is disposed between the envelope and the cover 42.

The shield 45 is formed of a relatively low friction material, preferably a plastic, such as Lexan, so that the shield has a lower coefficient of friction than the cover 42. The shield reduces the likelihood of an envelope buckling when it engages the retard assembly. More specifically, as described previously, the retard projects into the document path so that the leading edge of an envelope engages the retard assembly. Since the cover 42 is formed of a medium-friction resilient material, the lead edge of the envelope may tend to dig into the cover 42 rather then being displaced forwardly between the retard assembly 40 and the feeder 30. When the lead edge digs into the cover, the envelope may tend to buckle, causing a jam, especially if the envelope is thin so that the envelope does not have significant rigidity.

The shield reduces or eliminates the likelihood of an envelope digging into the cover 42. Instead, as the envelope engages the retard assembly, it contacts the low friction, relatively incompressible shield 45. The shield 45 folds over the cover 42 so that the envelope rides over the shield and onto the cover. The portion of the cover 42 that is downstream from the shield is oriented generally or substantially parallel to the document path. In other words, when the medium-friction cover 42 first engages the envelope, the cover engages the face of the envelope rather than the leading edge of the envelope. In this way, the shield significantly reduces or eliminates the likelihood of the envelope digging into the cover and buckling, causing a jam.

Qualifying Envelopes for Extraction

Referring again to FIGS. 2–3, the feeder 30 serially feeds the envelopes to the pre-sort module 50 that includes a plurality of detectors for examining each envelope to determine if the envelope meets certain criteria for being extracted. If an envelope meets the criteria for extraction, the envelope is directed to the cutting module 60 and the extracting module 120. Otherwise, the envelope is directed to one of a plurality of outsort bins 57 (shown in FIG. 5). The first extraction qualifying detector is a thickness detector 51. If the thickness of an envelope does not fall within a predetermined range, the envelope is electronically tagged by the system controller 19 and outsorted prior to extraction. For example, the basic mode of operation for the apparatus 10 is processing singles, which are transactions that consist of only one check and one invoice. Envelopes that contain only one document, such as a check without an invoice, will have a thickness that is less than the allowable range. Such envelopes are not qualified for extraction. In the same way, envelopes that contain more than two documents will have a thickness that is greater than an allowable range, and therefore may not be qualified for extraction. Envelopes that are not qualified for extraction are electronically tagged and outsorted prior to extraction so that the outsorted envelopes can be processed separately from the envelopes containing singles. In addition, the thickness detector 51 can operate to disqualify envelopes containing paper clips or returned credit cards because the envelopes typically have a thickness that is greater than the allowable range. Therefore, envelopes containing returned credit cards or paper clips, which generally require special handling, are outsorted prior to extraction.

The envelopes are then qualified by a metal detector 55. The metal detector 55 detects the presence of ferrous objects, such as staples and paper clips. If the metal detector detects the presence of a metallic object within an envelope, the envelope is not qualified for extraction and the system controller 19 electronically tags the envelope so that the envelope is outsorted prior to extraction.

From the metal detector, the system transport conveys the documents to a gate that is operable between two positions. Envelopes that were not qualified for extraction because they do not meets certain criteria are directed down an outsort path to one of the outsort bins 57 (shown in FIG. 5). For example, if the thickness detector 51 detects an envelope that has a thickness that is not within a pre-determined range, the system controller 19 does not qualify the envelope for extraction and the envelope is directed to one of the outsort bins 57.

Envelopes that are qualified for extraction are directed down the document path to the cutting module 60. In the cutting module 60, the leading edge, top edge and bottom edge of each envelope are cut so that the faces of each envelope are joined only along the trailing edge.

The details of the cutting module 60 are illustrated in FIGS. 5–9. The cutting module 60 includes three cutter assemblies: a first cutter assembly 70 that cuts the leading edge of each envelope; a second cutter assembly 90 that cuts the top edge of each envelope; and a third cutter assembly 110 that cuts the bottom edge of each envelope.

When an envelope enters the cutting module 60, the envelope is oriented so that the bottom edge of the envelope is down, and is generally parallel to the base plate 62 of the cutting module. The system transport 15 displaces the envelope forwardly into engagement with a kicker 72 that pivots the envelope so that the leading edge of the envelope is down, and is generally parallel to the base plate 62. The kicker 72 engages the leading edge of the envelope below the midpoint of the height of the envelope. In this way, as the system transport 15 displaces the envelope forwardly, the envelope pivots about the kicker 72. A pair of opposing upper guide rails 73 guide the envelope and prevent the envelope from falling over as it is conveyed along its short leading edge.

The first cutter assembly 70 then cuts the leading edge of the envelope. After passing through the first cutter assembly 70, the envelope engages a second kicker 92 that reverse pivots the envelope so that the envelope is once again conveyed with its bottom edge down. However, the envelope is vertically spaced from the base plate 62 so that the second cutter 90 is disposed vertically higher than the first cutter 110. The second cutter assembly 90 then cuts the top edge of the envelope, and then the system transport conveys the envelope to the third cutter assembly 110 that cuts the bottom edge of the envelope while the envelope is being conveyed with its bottom edge down.

Figure 6:
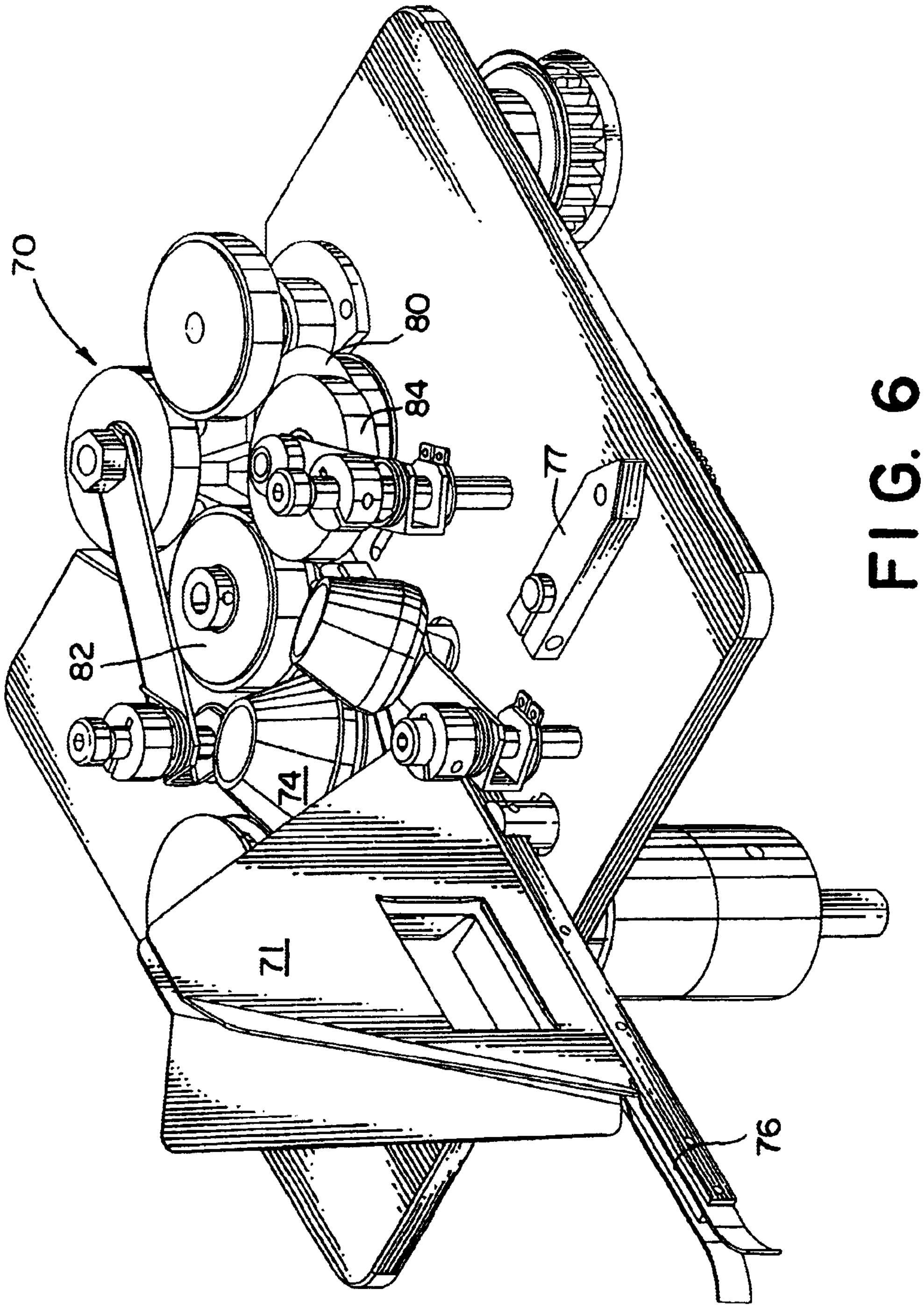
FIG. 6 is an enlarged fragmentary perspective view of a cutter in the cutting module illustrated in FIG. 5.

Referring to FIG. 6, the details of the first cutter assembly 70 are illustrated. The first cutter assembly 70 utilizes two opposing rotary knives or cutting blades 80 to slice off the bottom edge of the envelope. As the envelope enters the first cutter 70, a pair of laterally spaced mail guides 71 form an entrance slot for guiding and supporting the envelope as it is conveyed with its leading edge down. The mail guides are connected to and extend upwardly from a support rail 76 that is substantially horizontal. A justifier 74 in the form of angled opposing rollers, justifies the envelope downwardly so that the leading edge contacts the support rail 76. In this way, the height of the leading edge for all of the envelopes is consistent as the envelopes are conveyed to the rotary knives 80. A driver roller 82 and an opposing idler roller 84 adjacent the justifier 74 form a nip for receiving envelopes from the justifier. The idler roller 84 is pivotable and is biased toward the drive roller. The rotary knives 80 are driven by drive roller 82 and form a rotary shear in line with the envelope path and are positioned a small distance above the support rail 76. Accordingly, as the envelope is conveyed between the drive roller and the idler roller 84, the knives 80 slice through the leading edge of the envelope, severing a portion of the leading edge.

Figure 8:
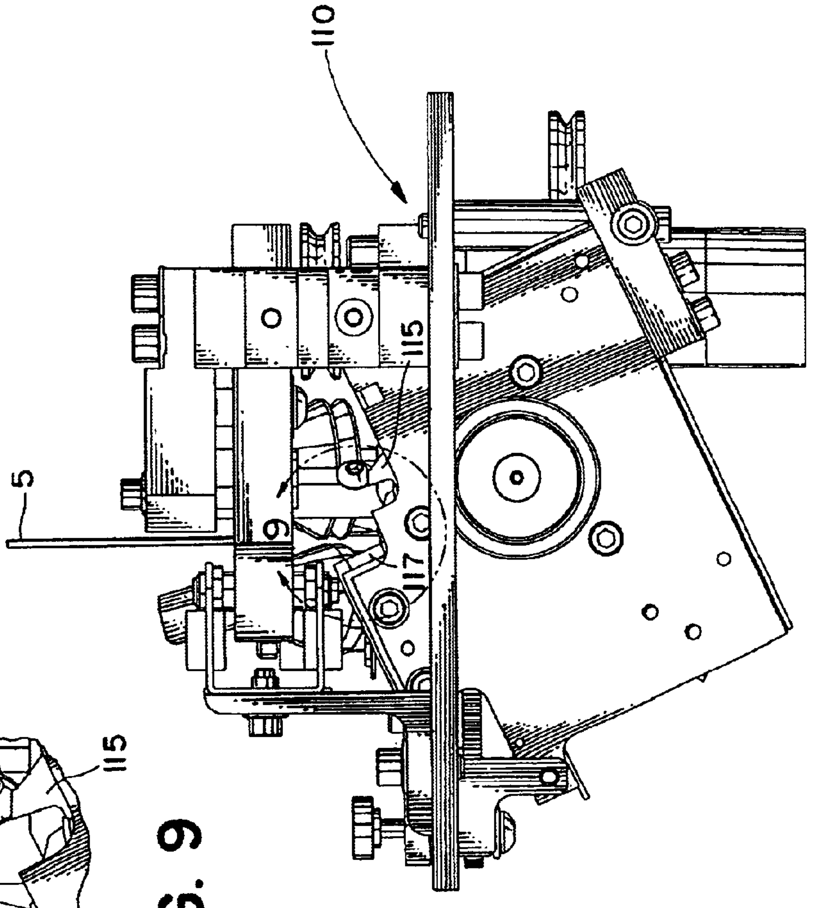
FIG. 8 is an enlarged fragmentary side elevational view of a third cutter in the cutting module illustrated in FIG. 5.
Figure 9:
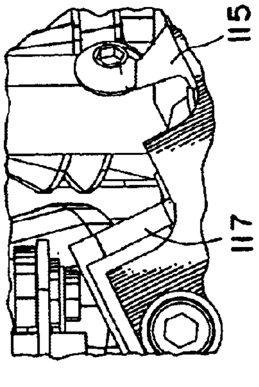
FIG. 9 is an enlarged fragmentary side elevational view of the detail A of the second cutter illustrated in FIG. 8.

The first cutter 70 includes a depth of cut controller 77 for varying the width of the portion of the envelope that the knives 80 severs. The depth of cut can be varied by either vertically adjusting the knives 80 or by vertically adjusting the support rail 76 that sets the height of the bottom edge of the envelope as the envelope is conveyed past the knives 80. In the present instance, the depth of cut is varied by adjusting the vertical position of the support rail. The elements of the depth of cut controller are the same as the elements of the depth of cut controllers for the second and third cutter assemblies 90,110, which are illustrated in FIGS. 7–9.

From the first cutter assembly 70 the envelope is conveyed to the second cutter assembly 90 that opens the top edge of the envelope. As described previously, between the first and second cutters, the envelope engages a second kicker 92 that reverse pivots the envelope so that the envelope is generally horizontally disposed with the top edge up and the bottom edge down, generally parallel to the document path.

Figure 7:
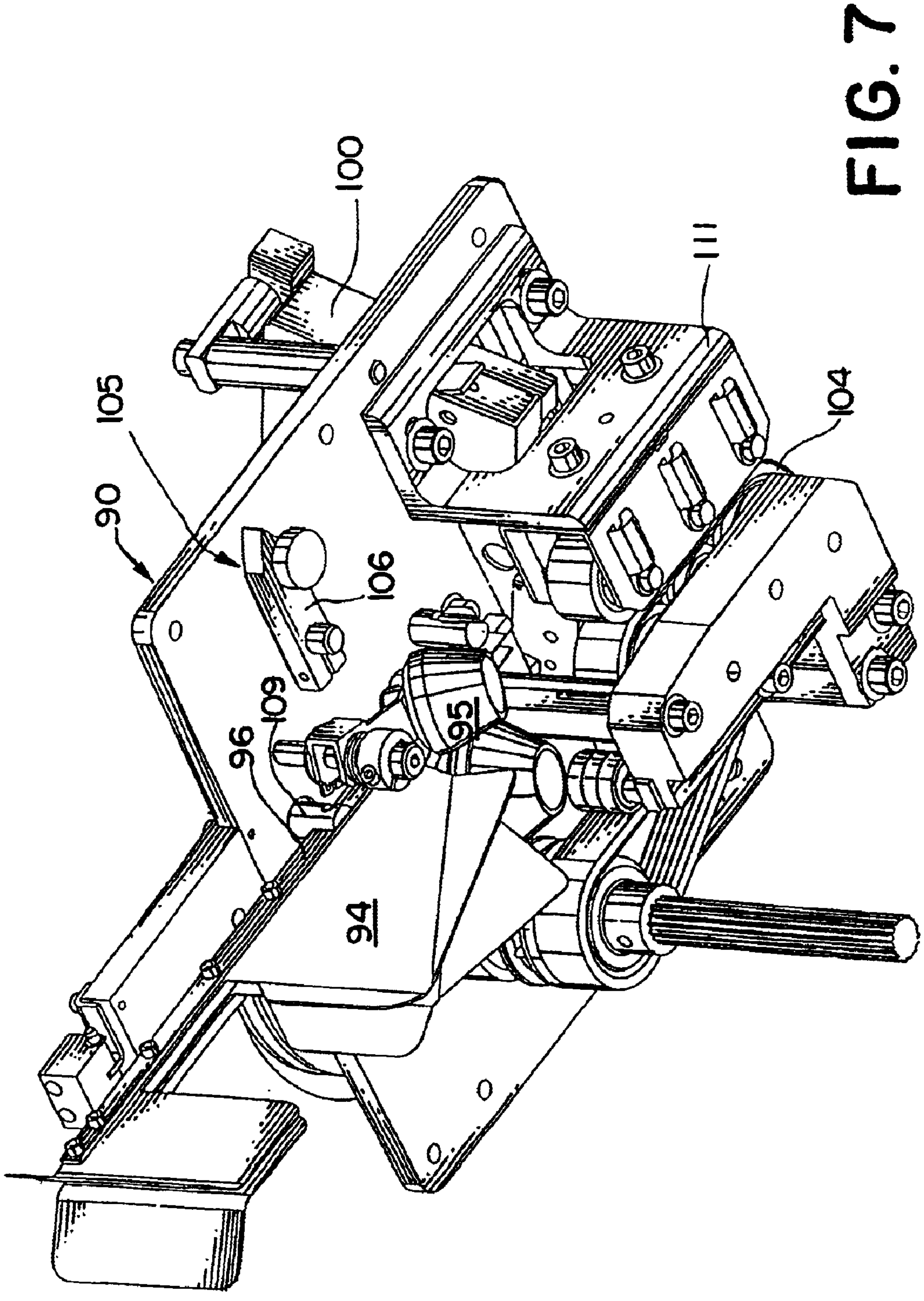
FIG. 7 is an enlarged fragmentary perspective view of a second cutter in the cutting module illustrated in FIG. 5 from a perspective that is below and upstream from the second cutter, looking upwardly at the second cutter.

Like the first cutter 70, the second cutter 90 has a pair of mail guides 94, a horizontal guide rail 96 and a justifier 95, as shown in FIG. 7. The mail guides 94 guide the envelope as it enters the second cutter. The justifier 95 displaces the envelope upwardly against the guide rail 96 to justify the top edge of the envelope against the guide rail.

The second cutter 90 can utilize rotary knives similar to the first cutter 70. However, preferably, the second cutter 90 includes a milling cutter 100 that cuts the top edge of the envelope. The milling cutter 100 is disposed transverse the document path and is disposed above the envelopes, so that as the envelope is conveyed through the second cutter, the milling cutter cuts downwardly into the top edge of the envelope. The milling cutter is disposed transverse the top edge of the envelope so that it does not produce a single severed portion that is the length of the top edge, as the rotary knives 80 in the first cutter 70 do. Instead, the cutter 100 makes a plurality of cuts, cutting the top edge of the envelope into a plurality of chips, each having a length that is approximately the width of the milling cutter or less.

A drive belt 104 conveys the envelope past the milling cutter 100. An idler pulley assembly 106 opposes the drive belt 104 and is biased toward the drive belt to form a nip for receiving the envelope from the justifier 95.

Figure 5:
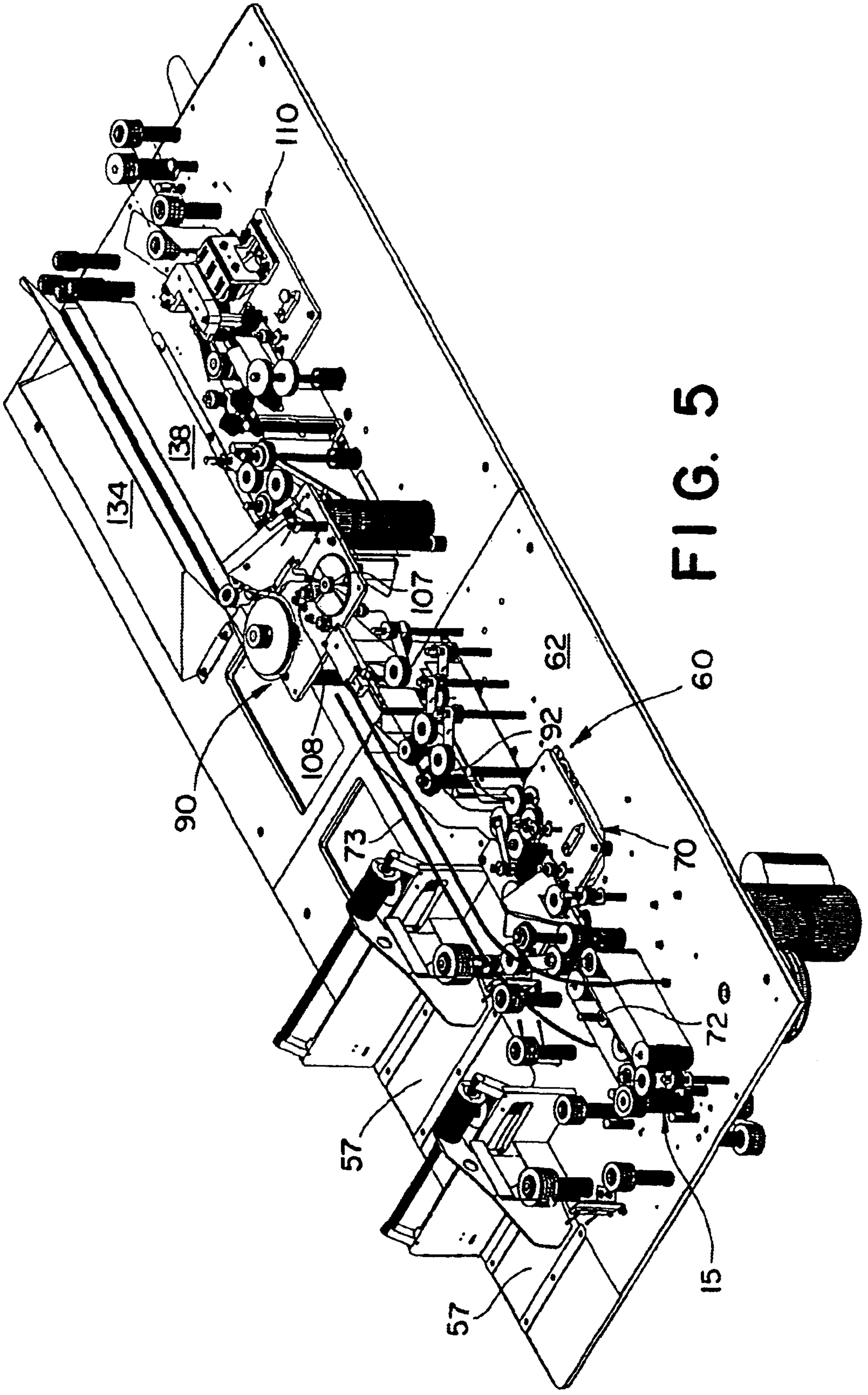
FIG. 5 is an enlarged fragmentary perspective view of the cutting module of the device illustrated in FIG. 1.

The second cutter 90 also includes a depth of cut controller 105 for varying the height of the support rail 96, which varies the vertical position of the top edge of the envelope relative to the milling cutter 100. Referring to FIGS. 5 and 7, the depth of cut controller 105 comprises a pivotable arm 106 fixedly connected to a drive gear 107 that engages a pair of internally threaded drive nuts 108. The drive nuts 108 include a plurality of gear teeth around the circumference of the nuts, which mesh with the drive gear 107. Accordingly, rotating the drive gear 107 rotates both drive nuts 108. A pair of posts 109 connect the support rail 96 with the drive nuts 108. One end of each post 109 threadedly engages the drive nut 108; a second end projects through the base plate of the second cutter 90 and is connected to the support rail 96. The two post 109 are spaced apart from one another along the length of the support rail 96.

Configured in this way, the depth of cut controller 105 operates as follows. Rotating the controller arm 106 in a first direction rotates the drive gear 107, which in turn simultaneously rotates the two drive nuts 108 forwardly. The forward rotation of the drive nuts 108 displaces the posts 109, which in turn displaces the support rail 96 upwardly toward the milling cutter 100. Accordingly, rotating the controller arm 106 in the first direction increases the depth of cut. Similarly, rotating the controller arm 106 in a second direction opposite the first direction displaces the support rail 96 downwardly, reducing the depth of cut.

Since the drive gear 107 causes both posts 109 to be simultaneously vertically displaced the same amount, the support rail 96 remains parallel to the document path and the base plate 62 of the cutter module 60 as the support rail is displaced vertically. This prevents the envelope from being vertically skewed as the envelope passes through the milling cutter 100. In addition, the depth of cut controller 105 is infinitely adjustable between the maximum depth of cut and the minimum depth of cut.

From the second cutter 90, the envelope is conveyed to the third cutter assembly 110, which cuts the bottom edge of the envelope. The third cutter 110 can comprise either rotary knives or any milling cutter. However, preferably, the third cutter 110 is substantially identical to the second cutter, except that the third cutter is a mirror of the second cutter 90. Therefore, preferably the third cutter 110 includes a milling cutter 115, which is identical to the milling cutter of the second cutter.

Referring to FIGS. 8–9, the details of the milling cutter 115 for the third cutter 110 are illustrated. The milling cutter assembly includes an anvil 117 that supports the envelope as it is cut. The anvil is disposed at an angle to the bottom edge of the envelope and the envelope path. As shown in FIG. 9, the anvil 117 and the teeth of the milling cutter 115 form an acute angle or "V" when each tooth is adjacent the anvil. The "V" is preferably centered on the document path. In this way, the top point in the rotation of the milling cutter is vertically spaced above the point that the bottom edge of the envelope engages the anvil 117. Such a configuration allows the cutter to cut a wider range of envelope thicknesses for a given depth of cut.

Extraction of Contents from Envelopes

From the cutting module 60, the opened envelopes are conveyed to the extraction module 120. In the extraction module 120, an extractor 121 extracts the contents of the envelopes from the opened envelopes. The apparatus 10 examines the envelopes to ensure that the contents are properly extracted. If not, the contents and envelope are reunited and conveyed to a reunite bin 134 (shown in FIG. 5). Properly extracted contents are conveyed to either the thick stack module 180 or a singulator 150 that separates the contents and serially conveys the contents along the document path. Optionally, a MICR module 175 identifies documents having a MICR line, such as checks, and is operable to identify the orientation of such documents based upon the location of the MICR line.

Figure 10:
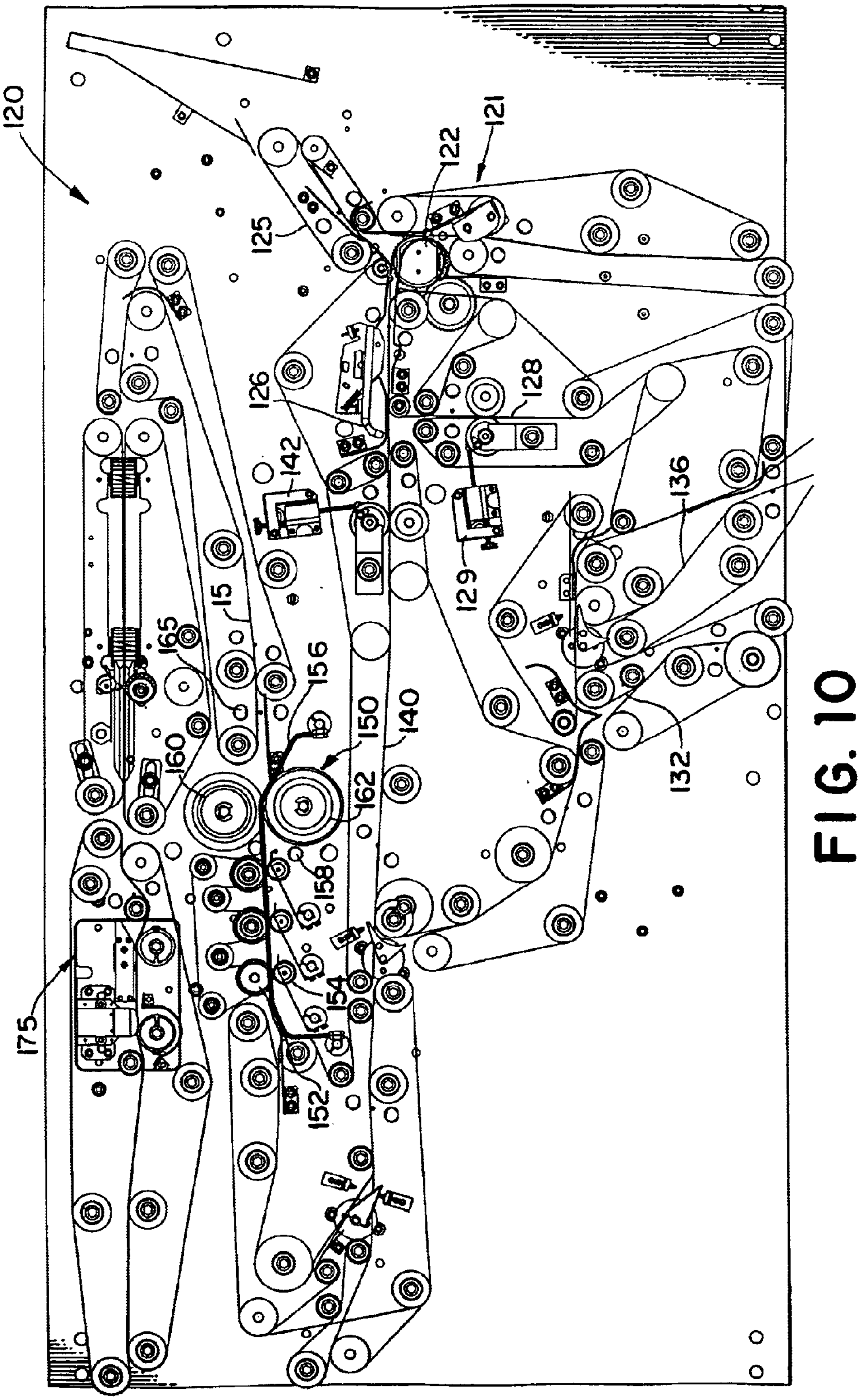
FIG. 10 is an enlarged fragmentary plan view of the extraction module of the device illustrated in FIG. 1.
Figure 11:
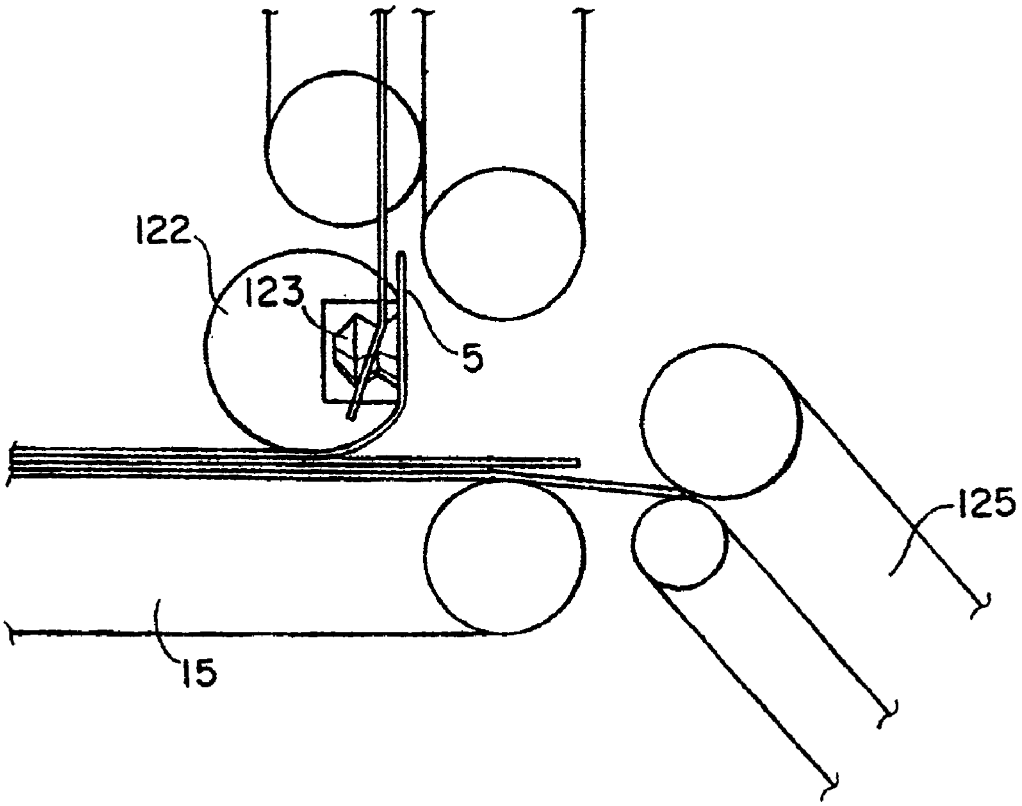
FIG. 11 is an enlarged fragmentary view of the extractor in the extraction module illustrated in FIG. 10, illustrating an envelope after it has entered the extractor.
Figure 12:
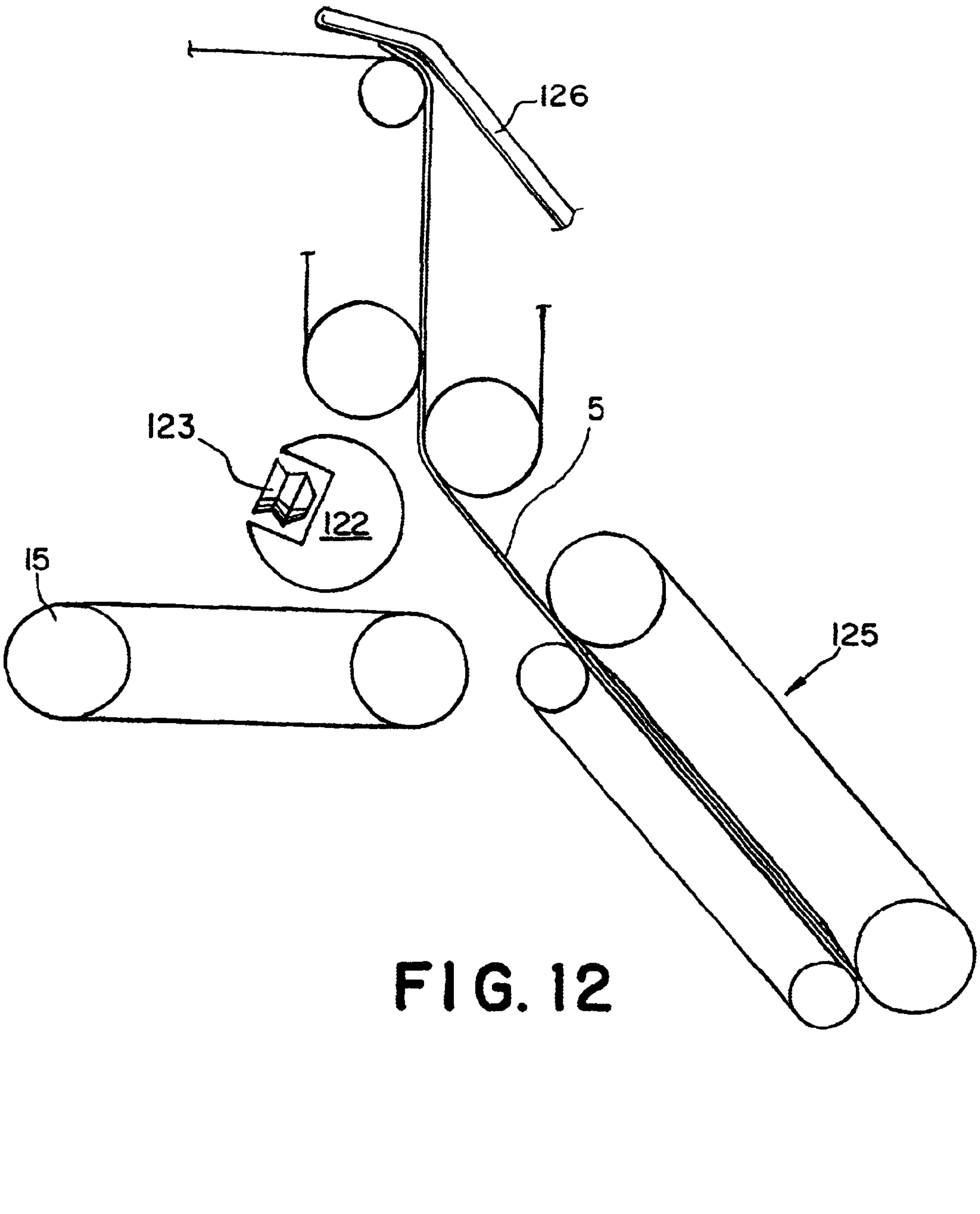
FIG. 12 is an enlarged fragmentary view of the extractor shown in FIG. 11, illustrating the envelope as it is exiting the extractor.

Referring now to FIGS. 10–12 the details of the extractor 121 are illustrated. The extractor 121 separates an envelope from its contents by peeling off one envelope face and then directing the envelope down one path, and the contents down another path. The operation of the extractor is more clearly understood with reference to FIGS. 11 and 12, which illustrate the progress of an envelope and its contents through the extractor.

In FIG. 11, an envelope is shown as it enters the extractor 121. The system transport 15 conveys the envelope and its contents past the rotatable extraction head 122. A suction cup 123 is disposed in a cavity in the extraction head 122. The suction cup 123 entrains one face of the envelope, referred to as the leading face. As the envelope passes through the extractor, the extraction head 122 rotates so that the leading face entrained by the suction cup is peeled away from the contents and is diverted transversely into an extraction transport as shown in FIG. 11. At the same time, the contents of the envelope and the trailing face are directed forwardly into a reversible transport 125, which conveys the contents and the trailing face away from the leading face.

As shown in FIG. 12, the faces of the envelope are conveyed away from one another until the faces are stretched end to end to form a single taught piece of paper joined in the middle by what was previously the trailing edge of the envelope. The reversible transport 125 then reverses directions and conveys the contents and the trailing face transversely into the extraction transport. A pivotable deflector 126 along the extraction transport directs the leading face toward an envelope path 128. After the leading envelope face enters the envelope path 128, the deflector arm 126 pivots away from the envelope path 128. The trailing face follows the leading face down the envelope path 128 because the faces are connected. However, because the deflector 126 has been pivoted away from the extraction transport, the contents of the envelope follows the contents path 140. In this way, the envelope is separated from its contents.

One of the documents in an envelope may not properly separate from the envelope, and may follow the envelope down the envelope path 128 rather than following the contents down the contents path 140. Accordingly, a pair of thickness detectors 129,142 are disposed along the envelope path 128 and the contents path 140. The envelope thickness detector 129 senses the thickness of the envelope as the envelope leaves the extractor 121, and compares the thickness of the envelope with a predetermined limit. If the thickness of the envelope exceeds a predetermined limit, the system controller electronically tags the envelope so that the envelope and its contents are reunited and directed along the reunite path 132 to a reunite bin 134. Similarly, if the contents thickness detector 142 indicates a thickness that is not within a predefined range, it is assumed that the contents were not properly extracted from their respective envelope. The system controller 19 therefore electronically tags the contents so that the contents are reunited with their respective envelope and directed along the reunite path 132 to the reunite bin 134 (shown in FIG. 5).

If the thickness detectors 129, 142 indicate that the contents have been properly extracted from their envelope, the envelope is directed along the trash path 136 to a discharge chute 138 (shown in FIG. 5), and the contents are directed along the contents path 140. If the documents are to be stacked without further processing, the contents are conveyed to the thick stack module 180 where they are stacked into bins. Alternatively, if the contents are to be separated and further processed before stacking, the contents are conveyed to the singulator 150.

Separating the Documents

Figure 13:
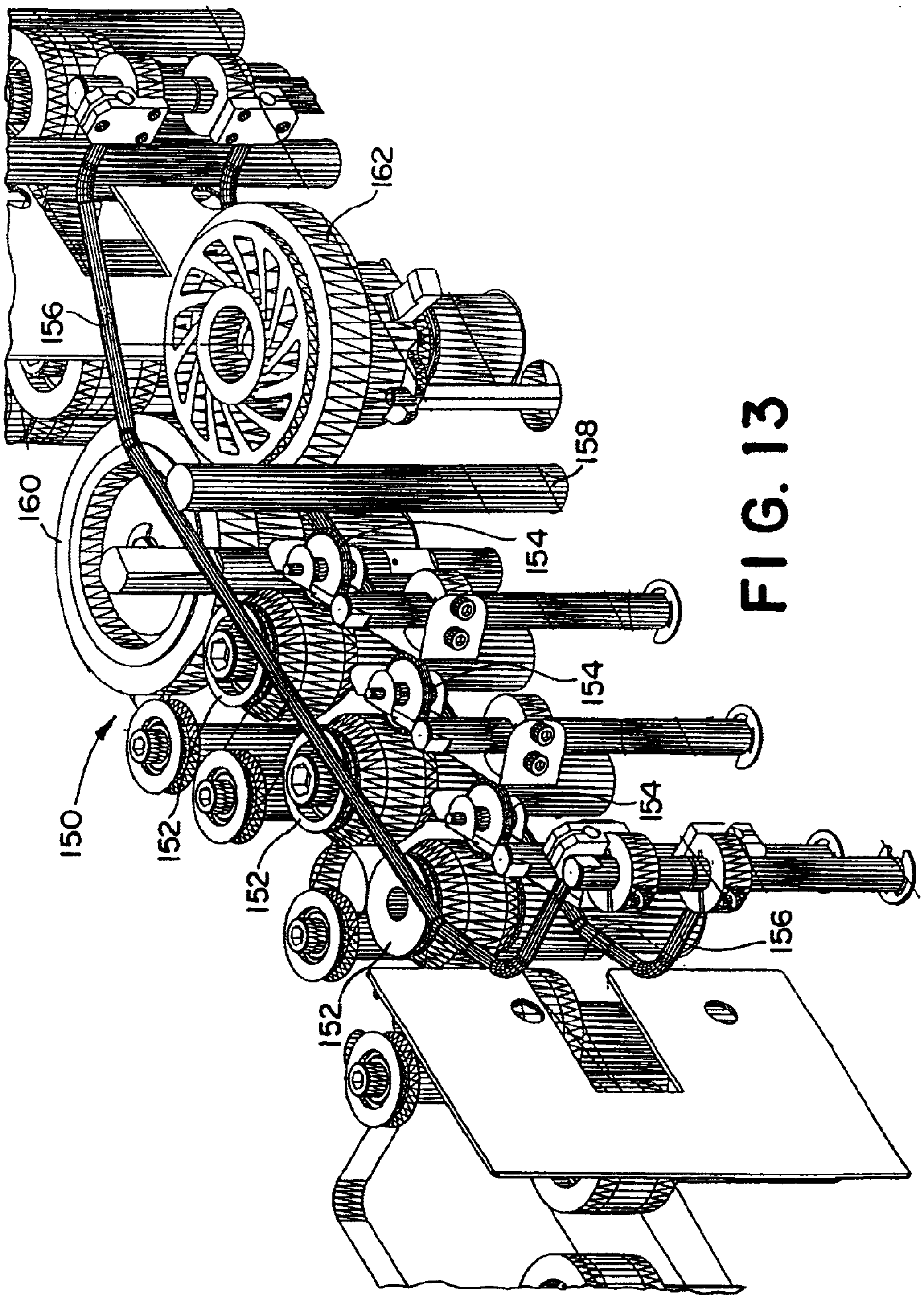
FIG. 13 is an enlarged fragmentary perspective view of the singulator in the extraction module illustrated in FIG. 10.
Figure 14:
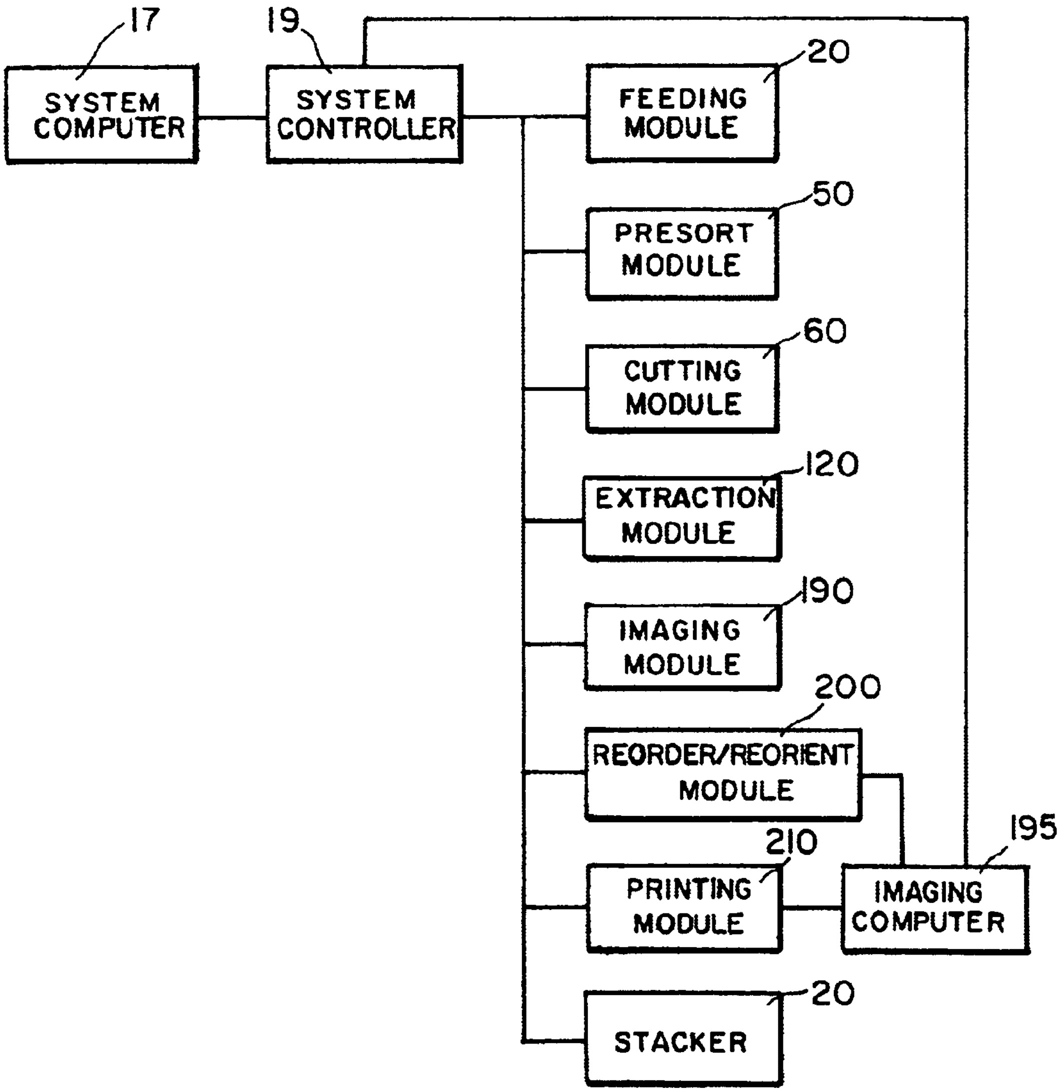
FIG. 14 is a block diagram illustrating the interconnection between the various modules of the device illustrated in FIG. 1.

Referring to FIGS. 10 and 13, the details of the singulator 150 are illustrated. The singulator 150 separates the documents and serially feeds them into the system transport 15 so that the documents are serially conveyed along the document path.

The singulator 150 comprises a plurality of pre-feeder rollers, which include a plurality of drive rollers 152 and a plurality of idler rollers 154. The pre-feeder rollers 152,154 feed the documents to a singulation nip formed between a drive roller 160 and a retard roller 162. A singulation sensor 158 identifies the leading edge of the documents as the documents enter the singulation nip. Preferably the singulation sensor 158 is an infrared sensor having a transmitting element and a receiving element disposed along the opposite sides of the document path.

The drive roller 160 and the retard roller 162 are each mounted on shafts that are releasably engageable with a drive source that drives both shafts in the same counterclockwise direction. Accordingly, when the drive roller 160 is engaged with the drive source, the drive roller 160 rotates counter clockwise, driving the documents forwarding through the singulator. When the retard roller 162 is engaged with the drive source, the retard roller also rotates counter clockwise. However since the retard roller is disposed on the opposite side of the document path from the drive roller 160, when the retard roller rotates counter clockwise it drives the documents rearwardly toward the pre-feeder rollers. A drive clutch controls the engagement between the drive pulley 160 and the drive source. Similarly, a retard clutch controls the engagement between the retard pulley and the drive source. Preferably the drive clutch and retard clutch are wrap spring clutches.

While the documents are staged at the singulator nip, the pre-feed rollers urge the documents forwardly while the retard roller 162 urges the documents rearwardly. This may lead to the documents buckling in response to the opposing forces. The buckled documents would likely cause a jam, which would temporarily stop processing of further documents. Therefore, preferably the apparatus includes structure for supporting the documents to prevent the documents from buckling. Specifically, preferably the device includes a pair of wire guides 156 that corrugate the documents.

The wire guides 156 are disposed along the document path through the singulator 150, generally parallel to the document path. The wire guides 156 are vertically spaced apart from one another. The upper wire guide is positioned vertically above the singulator rollers 152,154,160,162 and the lower wire guide is positioned vertically below the singulator rollers. Furthermore, the singulator drive rollers 152,160 project horizontally between the wire guides 156. Accordingly, the points of contact between the documents and the singulator drive rollers 152,160 and guide rails 156 are spaced apart from one another transverse the document path. In this way, the three points of contact between the documents and the singulator drive rollers 152,160 and guide rails 156 deform the documents into a corrugated pattern along the length of the documents. This corrugation stiffens the documents, preventing the documents from buckling in response to the opposing feed/retard forces in the singulator 150.

The drive roller 160 and retard roller 162 each comprise a tire that circumscribes the roller, forming an engagement surface that engages the documents. Preferably, the tires are formed of an elastomeric material. For instance, preferably the drive roller is formed of a natural rubber and the retard roller tire is formed of foam, such as closed cell urethane. The tire materials are selected so that the drive tire has a higher coefficient of friction than the retard tire and the retard tire has a higher coefficient of friction than the engagement surface of the pre-feed rollers 152,154. In addition, the tire materials are selected so that the friction between the drive and retard rollers and each document engaged by the drive and retard rollers is greater than the frictional force between the documents.

The singulator 150 is configured to singulate two or more but preferably less than twelve documents. For clarity, the following explanation describes the operation of the singulator 150 singulating three documents. The pre-feed rollers 152,154 urge the documents toward the singulator nip. After the leading edge of the documents pass the singulation sensor 158, the system controller 19 controls the drive clutch and the retard clutch so that the drive pulley 160 and the retard pulley 162 are engaged with the drive source. The drive pulley 160 engages the first document and the retard pulley 162 engages the third document, with the second document disposed between the first and second documents.

The drive pulley 160 drives the first document forward, while the retard pulley 162 drives the second and third documents rearwardly to hold back the second and third documents against the forward feed force of the pre-feed rollers and the forward feed force corresponding to the frictional force between the first document and the second document. The drive pulley 160 drives the first document into a system transport 15 nip, which conveys the first document downstream. Preferably the system transport 15 operates at a higher speed than the speed of the documents as they are conveyed through the singulator 150.

A singulator exit sensor 165 disposed along the document path downstream from the drive roller 160 identifies the leading edge of the first document while the drive roller remains in engagement with the first document. After the exit sensor 165 identifies the leading edge of the first document, the system controller 19 controls the drive clutch to disengage the drive roller 160 from the drive source so that the drive roller idles.

The system transport 15 engages the first document and pulls it through the singulator. During this time, the retard roller 162 continues to drive the second and third documents upstream. After the first document is pulled through the singulator, the wrap spring drive clutch recoils to drive the drive roller in the opposite direction so that the drive roller temporarily drives the second document upstream. The drive roller 160 then engages the drive source and the retard clutch disengages the drive source to allow the second document to be fed into the singulator nip. The retard clutch then reengages the drive source so that the retard roller 162 urges the third document rearwardly. The second document is then fed through the singulator in the same way as the first document described above. After the second document is conveyed through the singulator, the third document is conveyed through the singulator to the system transport 15. In this way, the singulator 150 singulates the first, second and third documents, so that the documents are serially fed into the system transport 15.

From the singulator 150, the apparatus 10 processes the documents by determining the order and orientation of the documents as the documents are conveyed through the system transport 15. When processing documents in transactions that were extracted from windowed envelopes, the order and orientation of the document in the window, such as an invoice, is known because the customer placed the invoice in the front of the envelope with the preprinted return address visible through the window. Therefore, the sequence of the documents in a transactional pair and the orientation of the invoice in the transaction are both considered constant when processing windowed mail. However, the orientation of the check in the transaction is not constant and therefore must be determined so that the check can be reoriented if necessary. Furthermore, when documents are extracted from windowless envelopes, the order and orientation of each of the documents is unknown.

Accordingly, the system transport 15 serially conveys the documents to a MICR module 175 that functions as a magnetic imager to determine the orientation of the checks or other documents having a MICR line. The MICR module 175 first imparts a magnetic charge to the magnetic ink on the checks. The orientation of each check is then detected by reading the flux variations of the characters or markings on the check as the check is conveyed past the MICR module 175. The orientation decision of the MICR module 175 is then transmitted to the system controller 19 which electronically tags the respective document with the orientation decision data.

The MICR module is also operable to verify that the documents in the transaction are in the proper sequence. If the MICR module 175 detects certain magnetic fluctuations in the document after the document has been magnetized, the MICR module tags the document as a check. Otherwise, the document is tagged as an invoice or as being an indeterminable document. The information regarding the document identification is communicated to the system controller 19. The system controller 19 then electronically tags each document in sequential order as being a check or an invoice based or the data from the MICR module 175. The MICR module 175 then uses the identification of each document to determine if the document in a transaction are in the proper order. For example, the desired sequence for a transactional pair of a check and an invoice may be invoice first, then check, referred to as invoice/check. If the MICR module 175 detects magnetic markings on the first document, then the first document is presumed to be a check and the documents in the transaction are out of order, i.e. check/invoice order rather than invoice/check. The documents in the misordered transaction are electronically tagged by the system controller 19 and reordered in the reorder/reorient module 200. If the MICR module 175 verifies that the documents in the transaction are in order, but the check is not in the proper orientation, the apparatus electronically tags the document so that the document is reoriented in the reorder/reorient module 200.

Imaging Module

From the extraction module 120 the documents that were identified for further processing and singulated are serially conveyed to the imaging module 190. The imaging module 190 obtains an electronic image of each document. The image data is then stored for retrieval during subsequent processing. In addition, the image data for a document can be utilized to determine the orientation of the document so that the document can be reoriented by the reorder/reorient module 200 as necessary.

The imaging module comprises a pair of high resolution line scan cameras disposed on opposing side of the document path so that the imaging module acquires an image of both sides of each document. An imaging computer 195 allows the operator to interface with the system controller 19 regarding operation of the imaging module 190 of the apparatus 10. The imaging cameras scans each document and acquires data representing the light intensity at discrete point of each document. For each point, or pixel, the light intensity is represented by a gray scale number ranging from 0 for black to 255 for white.

The image data for each document is processed so that various information regarding the document may be determined. For instance, the imaging computer 195 may attempt to read the OCR line on a document such as an invoice, which is necessary for later remittance processing because the OCR line for an invoice includes information about the customer's account and the amount of the invoice. The details of a device operable to acquire document image data, process the image data, determine information regarding the document based on the image data, and storing the image data, is illustrated and described in greater detail in U.S. Pat. No. 5,842,577 of Stevens et al., which is hereby incorporated herein by reference.

As described previously, the MICR module 175 is operable to identify the orientation of documents having magnetic ink markings, such as a MICR line, based on the location of the magnetic ink markings. However, the MICR module 175 does not determine the orientation of documents printed without magnetic ink markings. Accordingly, the image data acquired by the cameras can be processed to determine the orientation of a document regardless of whether the document has magnetic ink markings. The details of a method for determining the orientation of a document based on the image of the document is disclosed in greater detail in U.S. Pat. No. 5,293,431 of Hayduchok et al., which is hereby incorporated herein by reference.

Reorder/Reorient Module

Once the order and orientation of the documents in a transaction is determined, the apparatus 10 reorders and/or reorients the documents as necessary in the reorder/reorient module 200. In the reorder/reorient module 200, the documents first enter a reordering device. The reordering device functions to selectively reorder the sequence of successive documents in a transaction if the documents are determined to be in the wrong sequence. For instance, if a corresponding check and invoice are being conveyed so that the check precedes the invoice, in an application in which the invoice should precede the check, the reordering device switches the sequence of the check and invoice so that the invoice precedes the check along the path of movement.

From the reordering device, the documents are conveyed to a reorienting section that selectively reorients a document if the document is determined to be in the wrong orientation. Specifically, the reorienting section functions to selectively reverse and/or twist the document into the desired orientation. The details of an apparatus operable to reorder and reorient transactional documents is illustrated in greater detail in U.S. Pat. No. 5,926,392 of York et al., which is hereby incorporated herein by reference.

The apparatus 10 has been described above as optionally including the reorder/reorient module to reorder and reorient the documents if they are determined to be in either the wrong order or sequence. However, rather than manipulating a document into the proper sequence and orientation, the image of documents within a transaction can be manipulated so that the document images are in the proper order and orientation. The document images can then be used during later remittance processing rather than the actual documents. In such a scenario, the reorder/reorient module is unnecessary and can be eliminated.

For instance, the imaging computer 195 can scan the entire image of a document using optical character recognition to locate a string of characters such as an OCR line. Based on the location and orientation of the OCR line, the imaging computer 195 can determine the orientation of the document. Similarly, the image data can be utilized to determine the orientation of a check by optically scanning for the MICR line, and then determining the orientation of the check in response to the location and orientation of the MICR line. In addition, if necessary, the imaging computer 195 can distinguish a check from an invoice. Typically, the font used to print an OCR line on a document is distinguishable from the font used to print a MICR line on a check. Accordingly, the imaging computer can distinguish between a check and an invoice using the image data and identifying the font used to print the characters on the document.

Printing Module

After the documents are properly ordered and oriented, the system transport 15 conveys the documents to the printing module 210. The printing module 210 includes at least one inkjet printer that prints information on each document. For instance, the printer may print information on the document including data particular to the document, such as the batch number for the document, the document number, the transaction number for the transaction of which the document is a member, and the date on which the document was processed. The printed information can be used to locate a particular document within a stack of documents.

From the printing module 210, the system transport 15 conveys the documents to the stacker 220. The stacker 220 comprises a plurality of bins for receiving documents. The stacker is operable to sort the documents in a variety of ways according to parameters set by the operator for a particular batch of mail. For instance, the stacker 220 may sort the checks separately from other documents so that the checks are stacked together and the other documents are stacked together.

Method of Operation

Configured as described above, the apparatus 10 operates as follows. Referring to FIGS. 1–3, a stack of mail is placed on the conveyor 22 of the feeding module 20. The conveyor 22 conveys the stack of envelopes toward a plurality of pre-feed belts 24. The pre-feed belts 24 convey the envelopes on the conveyor to a feeder 30. When the feeder receives a signal from the system controller 19 indicating that an envelope should be fed, the feeder feeds an envelope to the pre-sort module 50 so that the envelopes are serially fed to the pre-sort module.

The pre-sort module 50 measures the thickness of each envelope and then scans each envelope for the presence of ferrous objects. Envelopes that do not meet certain criteria for extraction are directed to an outsort path to one of the outsort bins 57. Alternatively, envelopes that have characteristics that would otherwise disqualify them for extraction can be opened in the cutting module 60 and then conveyed to and stacked in the thick stack module 180. For instance, envelopes that are too thick to have their contents processed can be opened and then stacked in the thick stack module 180.

In addition, the system controller 19 preferably controls the feeding of the envelopes from the feeding module 20 in response to the thickness of a preceding envelope as measured by the thickness detector 51. For example, the system controller 19 controls the feeding of two adjacent envelopes as follows. The first envelope, referred to as the leading envelope, is fed to the pre-sort module 50 from the feeding module 20. The second envelope, referred to as the trailing envelope, immediately succeeds the first envelope in the series of envelopes fed by the feeder. After the feeder 30 feeds the first envelope, the second envelope is stationed at the feeder 30, waiting to be fed to the pre-sort module 50.

The thickness detector 51 measures the thickness of the first envelope. In response to the thickness of the first envelope, the system controller 19 determines the gap necessary between the first and second envelope to optimize the gaps between the first and second envelopes. Specifically, if the first envelope is qualified for extraction, the system controller 19 estimates the number of documents in the first envelope based on the thickness of the envelope and a predefined thickness, or predefined range of thicknesses, for a single document. The system controller 19 then determines the gap necessary between the first and second envelopes to ensure that the contents from the second envelope are not conveyed into the contents from the first envelope while the first envelope contents are staged at the singulator. In other words, if the system controller estimates that the first envelope contains four documents, the system controller controls the feeding of the second envelope to ensure that there is a sufficient gap between the contents of the first and second envelopes so that all four documents of the first envelope can be singulated by the singulator 150 before the contents of the second envelope arrive at the singulator. Alternatively, if the first envelope is not qualified for extraction, the system controller 19 controls the feeding of the second envelope to provide a gap between the first and second envelopes sufficient to ensure that the second envelope does not jam into the first envelope before the first envelope arrives at the outsort bin 57. As can be appreciated, if the first envelope has four documents, the gap required between the first and second envelopes is significantly greater than gap required if the first envelope is to be outsorted. In this way, the system controller 19 controls the gap between successive envelopes to minimize the gap between the envelopes while ensuring that the gap is sufficient to prevent interference between the two envelopes or the contents of the two envelopes.

In addition to utilizing the thickness of an envelope to determine the gap required between two successive envelopes, the length of an envelope can be utilized to determine the gap required between two successive envelopes. Specifically, the staging sensor 52 in the pre-sort module 50 is operable to detect the leading and trailing edges of an envelope. Since the speed of the envelope along the document path is known, the length of an envelope can be determined by measuring time interval between the time that the leading edge passes the staging sensor 52 and the time that the trailing edge passes the staging sensor. The system controller 19 can then control the feeding of a subsequent envelope based on the estimated number of documents within the preceding envelope and the length of the preceding envelope.

Envelopes that are qualified for extraction are conveyed from the pre-sort module 50 to the cutting module 60. In the cutting module, the envelopes are opened by cutting the top, bottom and leading edges of the envelopes. The depth of cut for each of the three sides can be the same. However, alternatively, and preferably, the depth of cut of the leading edge is thicker than the depth of cut for the top and bottom edges.

Since the exact location of the contents within the envelope are not known, it is desirable for each edge cut to be as shallow or thin as possible to reduce the likelihood that the contents will be cut. Ideally, the depth of cut would be minimized so that each cut would be a feather cut that just barely severs the edge. However, frequently one or more of the corners of an envelope are bent. If the bend is wider then the depth of cut, the bent corner will not be severed. For instance, if both corners of the leading edge of an envelope are bent and the top, bottom and leading edges are cut with a feather cut, the front and rear envelope faces will remain attached at the corners of the leading edge. This may prevent the contents from being properly extracted from the envelope.

Accordingly, preferably, the first cutter 70 is set to a relatively deep depth of cut to sever a fairly thick portion of the leading edge of the envelope. For instance, the first cutter is preferably set to a ⅛ inch depth of cut. The second and third cutters 90, 110 are set to a relatively shallow depth of cut to make a feather cut. For instance, the second and third cutters are set to approximately 1/32 inch depth of cut. By taking a thick cut from the leading edge, any bent corners on the leading edge are likely severed. In addition, since the top and bottom cuts are thin, it is unlikely that the top or bottom cuts will sever the documents. This is particularly advantageous for opening envelopes containing folding documents, because if the documents are severed along the top or bottom edges of the envelope, the documents are cut into multiple pieces along the width of the documents. In contrast, if folded documents are cut along the leading edge, a thin strip of the edge of the documents is cut off, but the documents are not cut in half.

From the cutting module 60, the opened envelopes are conveyed to the extraction module 120. The contents are extracted from the envelopes by an extractor 121. The apparatus 10 checks the contents and the respective envelope to ensure that extraction was successful. If not, the contents and the envelope are reunited and conveyed to a reunited bin 134 adjacent the cutting module 60.

After the contents of an envelope are extracted from the envelope, the apparatus 10 monitors the flow of the contents to maintain transactional integrity. This refers to ensuring that a document from one transaction (i.e. the contents of an envelope) do not become associated with documents from another transaction. For example, if two envelopes each contain an invoice and a check, the apparatus 10 monitors the flow of the documents to ensure that the invoice from the first envelope does not become associated with the check or invoice from the second envelope.

Depending upon the parameters established by the operator for a batch, the contents are either conveyed to the thick stack module 180 where the contents are stacked and no further processing is performed on the contents, or the contents are conveyed to the singulator 150 that separates the documents and serially feeds the contents along the document path for further processing. For instance, the operator can set the parameters for a batch so that all envelopes qualified for extraction are opened, the contents are extracted, and the contents are sent to the thick stack module 180. Alternatively, the operator can set the parameters for a batch so that envelopes having a thickness that exceeds a predefined range are opened, the contents are extracted and sent to the thick stack module 180. Envelopes having a thickness within the predefined range are opened, the contents are extracted and singulated for further processing.

Preferably, the apparatus 10 attempts to determine the order and orientation for each singulated document. The MICR module 175 scans each document to determine whether the document is a check or some other type of document, such as an invoice. If the MICR module 175 determines that a document is a check, the MICR module determines the orientation of the check. For instance, the MICR module 175 determines whether the check is front-face forward or front-face rearward, as well as whether the check is upright or inverted.

From the extraction station 120, singulated documents are conveyed to the imaging module that obtains an image of each document and determines the orientation of documents that are not checks by analyzing the image data for the respective document. In addition, the image data for each document is exported and stored on a nonvolatile storage medium, such as a hard drive, magnetic disk, or CD-ROM. Optionally, after the order and orientation of transactional documents are determined, the documents are manipulated in the reorder/reorient module 200, so that the documents are in the proper transactional sequence and orientation. Document information is then printed on each document at the printing module 210, and the documents are stacked into the bins of the stack or 220.

It will be recognized by those skills in the art that changes or modifications may be made without departing from the broad inventive concepts of the invention. For instance, the cutting module 60 can be configured so that the second cutter 90 utilizes rotary knives to sever the top edge of the envelope rather than using a milling cutter. In this way, the first and second cutters slice off the top and leading edges, while the third cutter 110 cuts the bottom edge with a milling cutter. Accordingly, the first and second cutters will preferably have a greater depth of cut then the third cutter.

Further, it may be desirable to jog the envelopes prior to placing the stack of mail on the conveyor. This is particularly desirable when rotary knives are used to sever the top edge of the envelope. The step of the jogging displaces the contents of the envelopes away from the edges that will be cut with a greater depth of cut. Specifically, in the alternative arrangement that utilizes rotary knives to sever the top edge of the envelope, the step of jogging displaces the contents toward the bottom and trailing envelope edges. This reduces the possibility that the contents of the envelope will be cut when the leading and top edges are cut.

In addition, typically, if the apparatus 10 determines that an envelope contains a folded document, the apparatus either outsorts the envelope prior to opening the envelope in the cutting module 60, or the envelope is opened, the documents are extracted, and then the documents are conveyed to the thick stack module 180, rather than being separated by the singulator 150. However, in certain applications it may be desirable to cut the folded documents and then extract and process the severed documents. In such applications, preferably the folded documents are designed so that information necessary during later processing is not printed on or adjacent the fold lines.

In such an application, the cutting module 60 is configured so that the top and/or bottom edges of the envelope are cut with a thick cut (i.e. the cutter(s) are set to a relatively deep depth of cut). This thick cut severs the folded document or documents into two or more separate portions. The extractor 121 then extracts the severed document portions as well as any other documents that may be in the envelope. Subsequently, the singulator 150 separates the document portions and other and thereafter the document portions and other documents are processed as if they were separate, individual documents.

For instance, if an envelope includes a first unfolded document and a second document folded into two halves, the cutting module 60 cuts the second document into two document portions. During subsequent processing, the transaction is processed as if it includes three documents. In other words, after extraction, the singulator 150 serially feeds the first document and the two document halves into the system transport 15. The apparatus 10 then may selectively determine the order and orientation and obtain an image of the first document and each half of the second document. Each document and document half may then be sorted and stacked in the stacker 220 separately.

Alternatively, when the apparatus 10 determines that an envelope includes a folded document, the system controller 19 may electronically tag the envelope as containing a folded document. The apparatus 10 can then track the severed document portions after extraction so that the document portions can be reunited.

The document portions can be reunited in at least one of two ways. First, the system controller 19 can monitor the processing of the two halves so that the two halves are sorted together in the stacker 220. Second, the system controller 19 can monitor the processing of the two halves and send a signal to the imaging computer 195 indicating that the document portions are severed document portions. The imaging computer 195 can either electronically tag the halves as being portions of the same document or the imaging computer 195 can combine the images of the two halves into one image data file. In this way, during subsequent processing, the two halves can be associated with one another.

It should therefore be understood that this invention is not limited to the particular embodiments described herein, but is intended to include all changes and modifications that are within the scope and spirit of the invention as set forth in the claims.

What is claimed is:

1. An apparatus for processing a leading piece of mail having contents comprising one or more documents and a trailing piece of mail having contents comprising one or more documents, comprising:

an envelope opener operable to open the pieces of mail along at least one edge;

a feeder for feeding the pieces of mail to the envelope opener;

a thickness detector for detecting the thickness of the leading piece of mail;

a system controller operable to control the feeder to feed the trailing piece of mail in response to the detected thickness of the leading piece of mail to maintain the proper spacing between the leading piece of mail and the trailing piece of mail; and an extractor operable to extract the contents from the opened pieces of mail.

2. The apparatus of claim 1 wherein the thickness detector is positioned between the feeder and the envelope opener so that the thickness detector detects the thickness of the leading piece of mail as the leading piece of mail is conveyed from the feeder to the envelope opener.

3. The apparatus of claim 1 comprising a singulator for separating the extracted contents and serially conveying the contents along the document path.

4. The apparatus of claim 3 wherein the separation station is operable to receive a packet of three documents and separate the documents from one another.

5. The apparatus of claim 1 comprising an input bin for receiving a stack of pieces of mail, wherein the feeder is operable to serially feed pieces of mail from the stack of mail.

6. The apparatus of claim 1 wherein the system controller controls the feeder in response to the magnitude of the detected thickness of the leading piece of mail.

7. The apparatus of claim 1 wherein the system controller is operable to delay the feeding of the trailing piece of mail by a time period determined based upon the magnitude of the detected thickness of the leading piece of mail.

8. The apparatus of claim 1 wherein the pieces of mail comprises envelopes containing three of more documents.

9. A method for processing a leading piece of mail having contents comprising one or more documents and a trailing piece of mail having contents comprising one or more documents, comprising the steps of:

feeding the leading piece of mail along an document path from an input bin;

opening the leading and trailing pieces of mail along at least one edge at an envelope opening station;

extracting the contents of the opened pieces of mail;

measuring the thickness of the leading piece of mail;

determining the gap necessary between the leading piece of mail and the trailing piece of mail based on the measured thickness of the leading piece of mail, wherein the gap is sufficient to avoid interference between the extracted contents as they are conveyed along the document path; and controlling the feeding of the trailing piece of mail along the document path to provide the determined gap.

10. The method of claim 9 wherein the step of measuring comprises measuring the thickness of the leading piece of mail as it is conveyed from the input bin to the envelope opening station.

11. The method of claim 9 comprising the steps of conveying the extracted contents along a document path to a sorter for sorting the extracted contents into one of a plurality of bins.

12. The method of claim 9 comprising the step of scanning the contents to determine the orientation of the extracted contents.

13. The method of claim 9 comprising the step of separating the extracted contents and serially conveying the contents along a document path.

14. The method of claim 9 wherein the steps of feeding the leading piece of mail and controlling the feeding of the trailing piece of mail comprise serially feeding the leading and trailing pieces of mail from a stack of mail in the input bin.

15. The method of claim 9 wherein the step of opening comprises cutting the pieces of mail open.

16. An apparatus for processing a leading piece of mail comprising an envelope containing contents of one or more documents and a trailing piece of mail comprising an envelope containing contents of one or more documents, comprising:

an envelope opener operable to open the envelopes along at least one edge;

a feeder for feeding the pieces of mail to the envelope opener;

a thickness detector for detecting the thickness of the leading piece of mail while the contents are within the envelope;

a controller operable to control the feeder to feed the trailing piece of mail in response to the detected thickness of the leading piece of mail to maintain the proper spacing between the leading piece of mail and the trailing piece of mail.

17. The apparatus of claim 16 wherein the thickness detector is positioned between the feeder and the envelope opener so that the thickness detector detects the thickness of the leading piece of mail as the leading piece of mail is conveyed from the feeder to the envelope opener.

18. The apparatus of claim 16 comprising a singulator for separating the extracted contents and serially conveying the contents along the document path.

19. The apparatus of claim 16 comprising an input bin for receiving a stack of pieces of mail, wherein the feeder is operable to serially feed pieces of mail from the stack of mail.

20. The apparatus of claim 16 wherein the separation station is operable to receive a packet of three documents and separate the documents from one another.

21. The apparatus of claim 16 wherein the system controller controls the feeder in response to the magnitude of the detected thickness of the leading piece of mail.

22. The apparatus of claim 16 wherein the system controller is operable to delay the feeding of the trailing piece of mail by a time period determined based upon the magnitude of the detected thickness of the leading piece of mail.

23. The apparatus of claim 16 wherein the pieces of mail comprises envelopes containing three of more documents.

* * * * *